July 25, 1967 J. R. BROWN, JR 3,333,244

ANALOG SIGNAL RESPONSIVE CIRCUIT FOR RECOGNIZING UNKNOWNS

Filed Nov. 6, 1964 5 Sheets-Sheet 1

INVENTOR.
JOSEPH REESE BROWN, JR.
BY
Christie, Parker & Hale
ATTORNEYS.

July 25, 1967 J. R. BROWN, JR 3,333,244

ANALOG SIGNAL RESPONSIVE CIRCUIT FOR RECOGNIZING UNKNOWNS

Filed Nov. 6, 1964 5 Sheets-Sheet 2

INVENTOR.
JOSEPH REESE BROWN, JR.
BY
Christie, Parker & Hale
ATTORNEYS.

INVENTOR.
JOSEPH REESE BROWN, JR.
BY
Christie, Parker & Hale
ATTORNEYS.

INVENTOR.
JOSEPH REESE BROWN, JR.
BY
Christie, Parker & Hale
ATTORNEYS.

INVENTOR.
JOSEPH REESE BROWN, JR.
BY Christie, Parker & Hale
ATTORNEYS.

United States Patent Office
3,333,244
Patented July 25, 1967

3,333,244

ANALOG SIGNAL RESPONSIVE CIRCUIT FOR RECOGNIZING UNKNOWNS

Joseph Reese Brown, Jr., Pasadena, Calif., assignor to Burroughs Corporation, Detroit, Mich., a corporation of Michigan Filed Nov. 6, 1964, Ser. No. 409,459
6 Claims. (Cl. 340—146.3)

This invention relates to a circuit for identifying an unknown and, more particularly, to an identifying circuit for automatically selecting, from among a plurality of analog signals which are directly proportional to the closeness of a match between the unknown and a plurality of knowns, the one analog signal which identifies the unknown.

In modern day industries, it is desirable to automatically and rapidly identify an unknown by electronic circuitry in an economical manner. One standard approach of identifying an unknown, such as a character, is by "digitizing" the unknown character in that it is reduced to a matrix of binary ones and zeros much in the manner of standard television transmission practices. Reduced in this form, the unknown is acceptable by a computer and may then be categorized by an appropriate program. This process, however, requires much programming, storage, and computating time for the computer.

Identification of unknown characters has also been accomplished by a feature matching technique which is based on a probability theory that specific features of an unknown are more closely associated with one known character than any other of the known characters. This probability theory is implemented by a rather lengthy sequence of computer oriented mathematical operations, which involve considerable electronic circuitry.

Both of these above-mentioned techniques involve the utilization of complex electronic circuits which are required to reduce the unknown to matrix or binary values in order to perform the mathematical operations necessary in each technique. Accordingly, the cost of these techniques make them prohibitive in many industrial applications.

The circuitry of this invention accomplishes the identification of an unknown in a simple and straightforward manner requiring a minimum of mathematical operations, and hence, far less electronic instrumentation than the techniques mentioned hereinbefore. The unknown identifying circuit of this invention optically matches an unknown with a plurality of known standards and each match is electrically converted into an analog signal. Each one of the plurality of analog signals so obtained is stored in its own maximum reading storage circuit. All of the electrical signals so produced are thereafter mixed and the maximum signal, as yet still unidentified, is selected, reduced in value, and once again compared with the stored signals. This selected and reduced signal is less than one of the stored signals but is greater than all of the remaining stored signals. An indicating device associated with this one maximum stored signal is automatically activated and the unknown is thereby identified, by this simple, inexpensive and straightforward operation.

A particular application of the principles of this invention is exemplified in an optical character recognition system, which employs mask matching. Here the darkened image of an illuminated unknown is projected onto a mask which is opaque except for negative, or transparent, known characters thereon. This projection results in a certain amount of light passing through the mask. When the darkened image of the unknown completely fills the transparent area defining the known, no light passes through, and an identical match has occurred. The variations in light passing through the mask are converted to electrical energy in the form of a W type voltage which has one positive peak intermediately located between two negative peaks. The analog difference signal between the positive and negative peaks varies according to the amount of light passing through the mask which in turn depends upon the closeness of the match. To identify the unknown character, it is necessary to determine the magnitude between these voltage peaks so produced, and compare each determination against all the other determinations.

In a system, such as an optical character recognition system, where a plurality of knowns are rapidly compared to an unknown, the circuit of this invention achieves a considerable savings of equipment by comparing the unknown with groups of knowns to obtain several groups of analog signals, each having distinct maximum and minimum voltage levels. In accordance with the invention, a preferred embodiment of a sampling circuit for one group of input signals additionally includes a first gating means connected between the signal source and the voltage level detecting means for passing a selected portion of the one input group signal. There is further included a second gating means for passing to the detecting means the maximum voltage level of the selected portion passed by the first gating means.

These and other features and advantages of the present invention will be understood more clearly and fully upon consideration of the following specification and drawing in which.

Figures 1, 2:
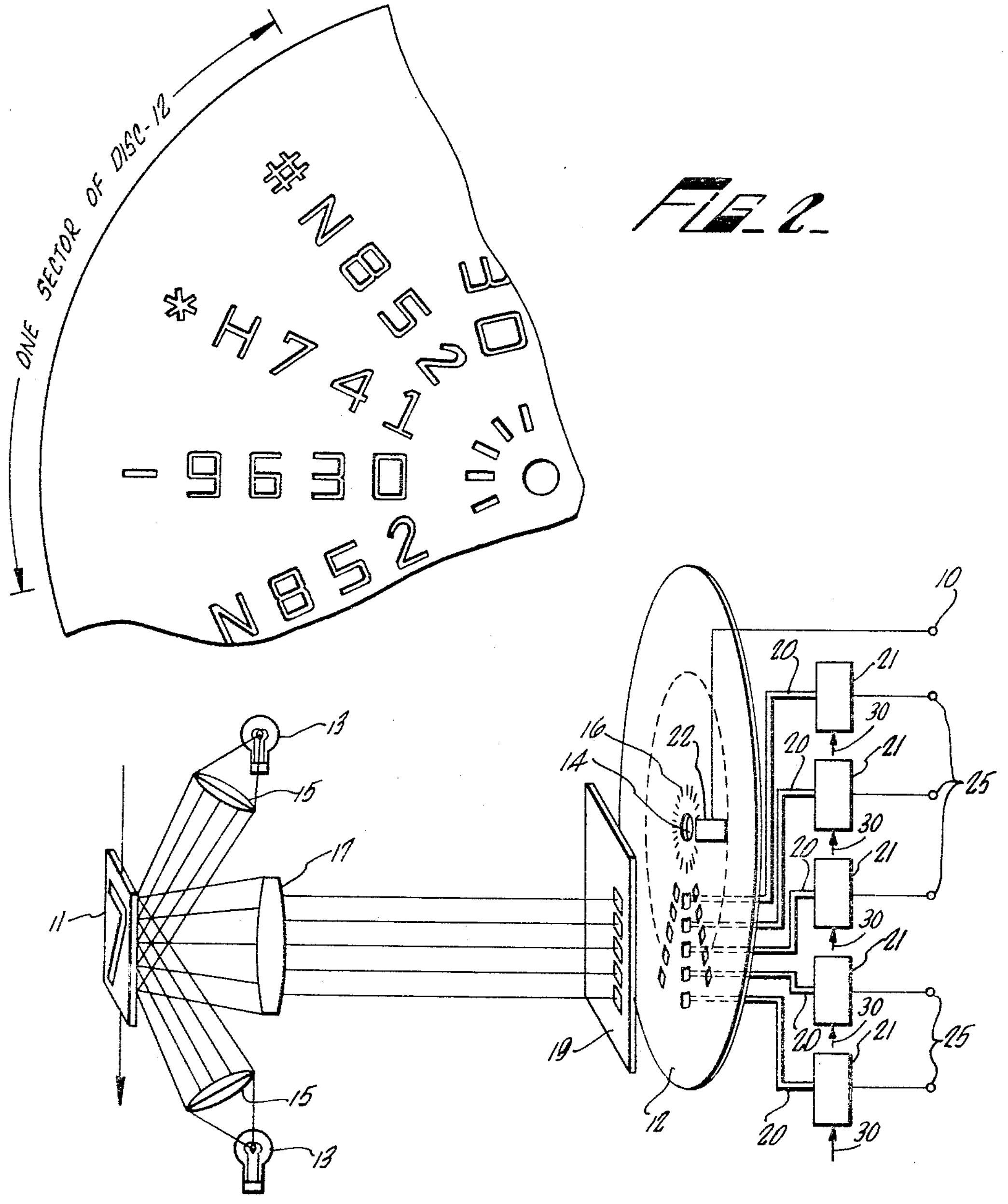
FIG. 1 is a pictorial diagram of a mask matching optical character recognition system.
FIG. 2 is an enlarged view of a portion of the mask of the system in FIG. 1.

An optical character recognition system employing mask matching is shown in pictorial form in FIG. 1. An unknown character 11 is compared with a plurality of known characters that are etched or in some way impressed upon a disc 12. The disc 12 is a solid material which rotates about a center point 14. The disc may be rotated at any desired speed by placing a shaft through the center point 14 and connecting a motor thereto. For illustrative purposes, it is assumed that a mask includes 15 known characters etched in the disc 12. These characters are divided into three groups of five known characters. The five knowns of each group are positioned on a common radius of the disc 12. These fifteen known characters make up a complete mask, in one sector, and are repeated in other sectors around the disc 12 in order to provide several comparisons for one identifying operation.

A light source 13 is provided to illuminate the unknown character 11 and to project its image upon the disc 12. The light from source 13 passes through an optical system 15 intermediate the unknown character 11 and source 13. The light illuminates the unknown character 11 and projects its image as a darkened area or absence of light through an optical system 17, which forms parallel rays of light. The parallel rays of light pass through a shutter 19 and the rays project the darkened image of the unknown character on one group of the known characters on disc 12. Beyond each known character on the disc 12 is positioned a transmission path for the light, which may be, for example, fiber optics 20. The light passing through each known character is transmitted through the fiber optics 20 to a photosensing device such as a photomultiplier tube 21.

An enlarged view of a portion of the disc 12 is shown in FIG. 2, in which certain characters are shown as negatives in the opaque disc 12. Additionally, the selection of 15 characters is for illustrative purposes only and more or less characters may be employed in the system. Each known character has a different area through which light can pass. Therefore, as the light is transmitted through the shutter 19 and onto the disc 12, different amounts of light are passed for different known characters. This light terminates on the light sensitive devices or photomultiplier tubes 21, which convert the light into electrical energy. Varying amounts of light are passed by each character, and thus the overall output voltage levels of the photomultiplier tubes 21 vary for different known characters.

Figure 5:
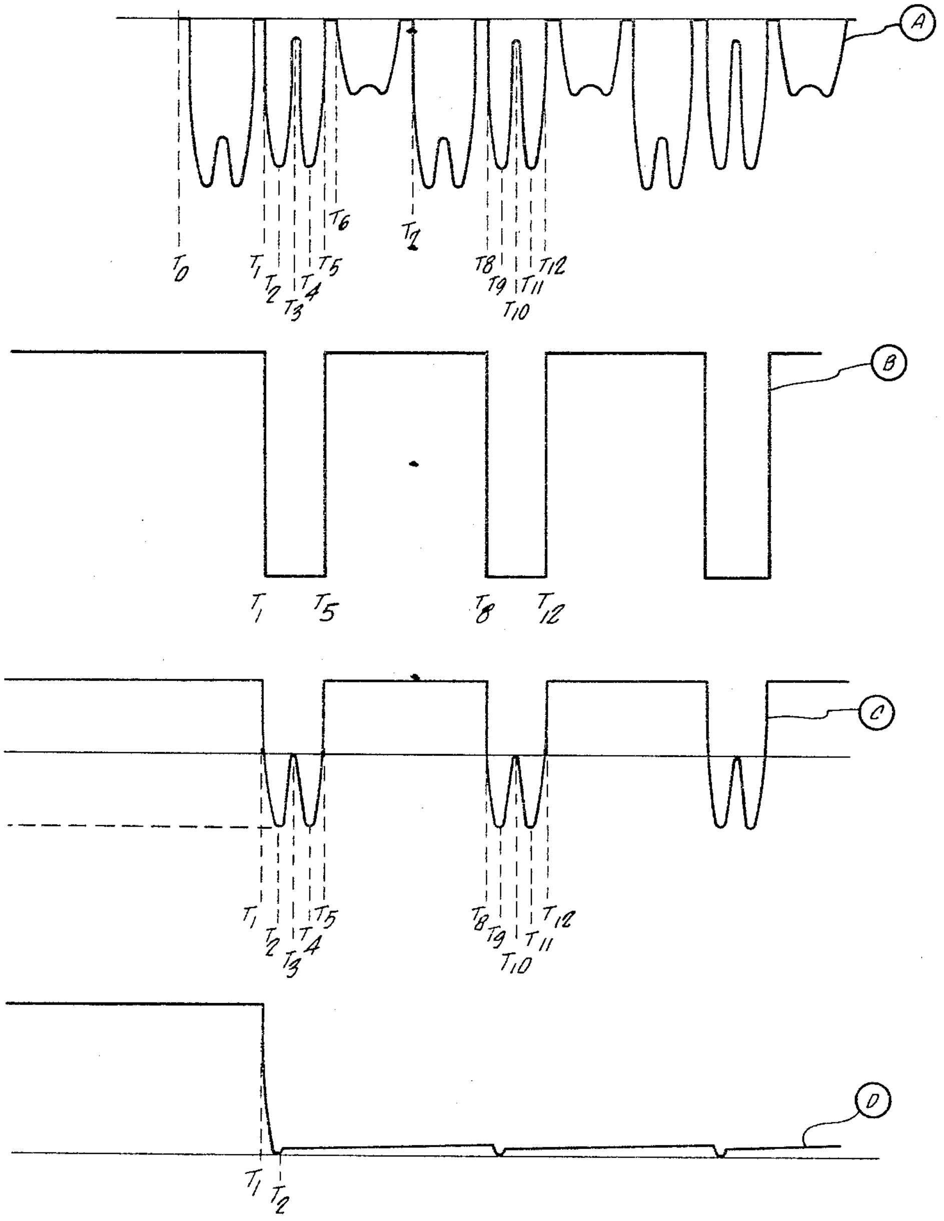
FIGS. 5 and 6 are pictorial representations of the waveforms that exist in the sampling circuit shown in FIG. 4.

As three known characters on one common arc of one sector of disc 12 are repetitively scanned by the projected image of the unknown character during rotation of disc 12, an output voltage having the waveform A, FIG. 5, will result at one of the output terminals 25 of one of the photomultiplier tubes 21. Waveform A of FIG. 5, between time interval $T_0$ through $T_7$, includes one group of three different analog signals. Each one of these signals corresponds to the closeness of the match between the unkonwn and different ones of the three known characters sensed by a single photomultiplier tube 21 as the disc 12 is rotated. These three analog signals are repeated a predetermined number of times while the unknown character which they are sampling is moved slightly either in a horizontal or vertical position in order to achieve a more accurate representation of an identical match.

If it were possible to position the unknown character exactly in a line of sight relationship with its matching known character of the mask, the above-mentioned character movement would not be necessary. However, this identical centering, or registration, between the unknown and the known of the mask cannot be guaranteed since printing variations exist in documents to be read. For example, a printed document may have a vertical and horizontal variations along a line of print, and such variations are compensated for by document movements. For example, the arrow in FIG. 1 shows a vertical movement for unknown 11 and a horizontal scan by disc 12 and fiber optics 20. It should be understood, however, that the direction of scan and document movement depends upon the printing layout of the document. For example, for a page of standard print, a horizontal movement and a vertical scan would allow the degree of brightness of the page on each side of a row of print to establish a reference with respect to the matches for the printed row. In any event, however, numerous scans are made per character, and these scans together with controlled movement of the unknown character, guarantee as nearly as possible that at some one particular scan, the unknown and the known, will match identically.

Reference to waveform A of FIG. 5 shows that each one of the W shaped analog signals has two negative peaks and a less negative, or positive peak, substantially at the midpoint of each analog signal. This particular waveform results from the light variations which occur as the known character enters into, matches, and then passes beyond the line of sight relationship between the photomultiplier tubes 21 and the unknown character. For example, at time $T_1$ of wavefrom A at FIG. 5, a gradually increasing amount of light passes through the transparent known character until at time $T_2$, a maximum amount of light passing through the mask produces a negative voltage peak. This peak at time $T_2$, with a positive reference is also referred to herein as a minimum voltage level. Thereafter, as the known character scans through the projected image, less light will be passed to the photomultiplier tube and at time $T_3$ a positive, or less negative, peak will be produced. This positive peak is also referred to herein as a maximum voltage level. As the known character passes on through the projected image, more light will again be passed until another negative peak is attained. Thereafter, the known character will pass through the image and only the opaque disc 12 will appear, at time interval $T_5$ through $T_6$, between the projected image and the photomultiplier tubes 21. Thus, no light will pass and zero voltage is produced at time $T_5$ through $T_6$ until the next known character arrives in the optical path. The difference between the maximum and minimum voltage levels for each comparison of a known with the unknown will be relative and will be greatest when the unknown and known are identical or matched.

In the waveform just discussed, it is assumed that the waveform of $T_1$ through $T_5$ was produced when the known character 7 of disc 12 matched the unknown which is also a 7 as shown in FIG. 1. The other two signals of the first group of waveforms A of FIG. 5 are produced by the knowns 6 and 8 on disc 12, of FIG. 2, which do not match the unknown, or 7.

In addition to the known characters that are etched on the disc 12, there is provided a timing track 16 near the center of the disc. Each mark on the timing track 16 is associated with the five known characters on a given radius. The timing track 16 has a sensing device 22 which generates and delivers an output voltage each time one of the marks on the timing track passes the sensing device 22. Thus, for each analog signal appearing at the output of each photomultiplier tube 21, there will be a voltage pulse at the output of sensing device 22. This voltage output, in a manner described in detail hereinafter, controls the timing of the unknown identifying network.

The output of each photomultiplier tube in the optical character recognition system of FIG. 1 and the timing track output are applied to an electronic system for detecting the various matches, in order to determine the identity of the unknown character. A preferred embodiment of the electronic circuitry employed is shown in block form in FIG. 3. Each photomultiplier tube 21 will have three separate output signals repetitively appearing thereat with each W shaped signal having two distinct minimum voltage levels and one maximum voltage level. Each output signal is produced as one of the three known characters of each mask is compared with the unknown. Thus, with the five multiplier tubes producing three distinct output signals, there will be a total of fifteen signals to be compared.

Figure 3:
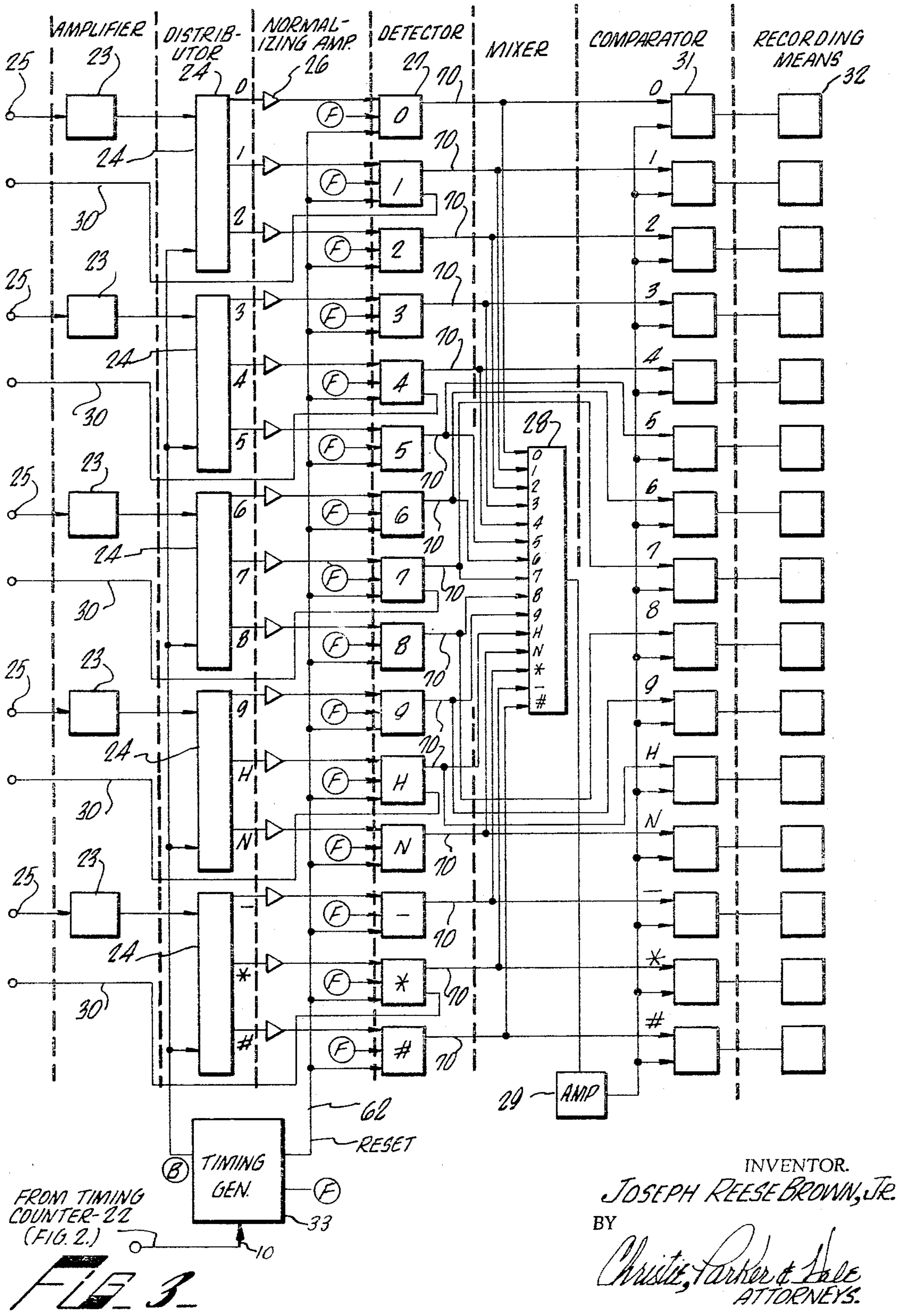
FIG. 3 is a block diagram of the electronic portion of the optical character recognition system shown in FIG. 1.

The outputs of the photomultiplier tubes 21 are coupled through terminals 25 to individual photomultiplier tube amplifiers 23 in FIG. 3. Thereafter, the three distinct analog signals which appear at the output of each photomultiplier tube will be amplified in three successive time intervals by the same one of the amplifiers 23 and applied to one of the distributor circuits 24. Each distributor circuit 24 has three output terminals upon which the three distinct amplified signals from the multiplier tube will successively appear. The distributor 24 may advantageously by three gates connected as a stepping circuit. The gates of the stepping circuit are fed in common by an amplifier 23 and are successively activated by signals from the timing generator 33, which in turn in responsive to the timing track 16 on the disc 12 and sensing circuit 22 of FIG. 1. Thus, as each voltage pulse is produced by sensing device 22, the distributor 24 moves one step so that the three distinct signals will be separated and will be gated out at successive times on individual output leads of distributor 24.

Fifteen individual channels are included in the electronic circuitry of FIG. 3. Each channel includes a normalizing amplifier 26, which is pre-adjusted such that all the negative peaks are referenced at exactly the same minimum voltage values. The minimum values are advantageously made equal so that it will only be necessary to monitor the positive peak or maximum voltage level variations in determining the identity of the unknown character. The output of each normalizing amplifier 26 is proportional to the area of the known character associated with it. This gain is adjusted for each of these different areas so that all the negative peaks are at the same minimum voltage level. A minimum level retaining circuit in one detector circuit 27 of each group of three detectors associated with one distributor circuit 24, feeds back the voltage it retains by leads 30 to the photomultiplier tube 21 for each group. This feedback operation and amplifiers 23 and 26 assure, in a well-known manner, that the loop gain for each group is held constant. This minimum level retaining circuit comprises a negative peak detector and a buffer amplifier. It is shown in FIG. 4 and will be described in detail in connection with the description of the circuit of that figure.

Each detector 27 has two input leads and a reset lead. One input lead is activated only for a portion of the duration of the activation of the other input lead and thus samples only a selected portion of the input signal passed by the first input lead. This input gating sequence isolates a positive peak, or maximum voltage, from the negative peaks, or minimum voltage levels, in order to perform a peak detecting operation described in detail hereinafter. One input lead, coupled to an amplifier 26, has applied thereto an input analog signal having one of the waveforms shown generally as waveform A in FIG. 5. As noted above, the three analog signals from each tube 21 of FIG. 1 are separated in distributor 24 so that only one analog signal, associated with a certain known character, will be applied to each individual channel.

Figure 6:
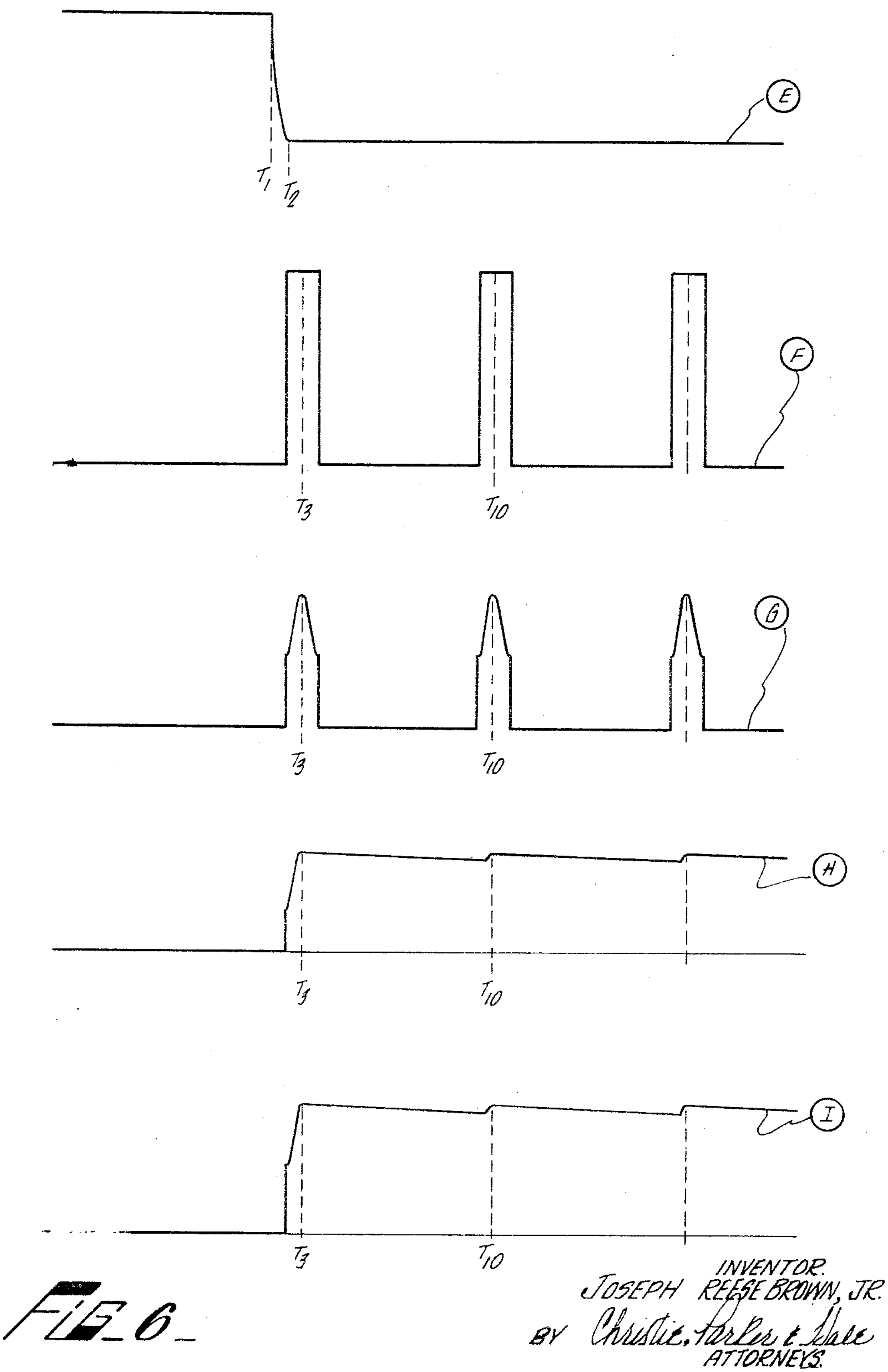

Output signals from the timing device 22 of FIG. 1 are applied to the timing generator 33 of FIG. 3 which produces, for each input pulse, two related output gate pulses on leads B and F as shown generally as signals B and F in FIGS. 5 and 6, respectively. When these two gate pulses are applied to the first portion of distributor 24 and to the input terminal of the first detector 27, the positive peak, is isolated from the negative peaks. This isolation operation and the detector 27 will be described more fully in connection with the preferred embodiment shown in FIG. 4.

Figure 4:
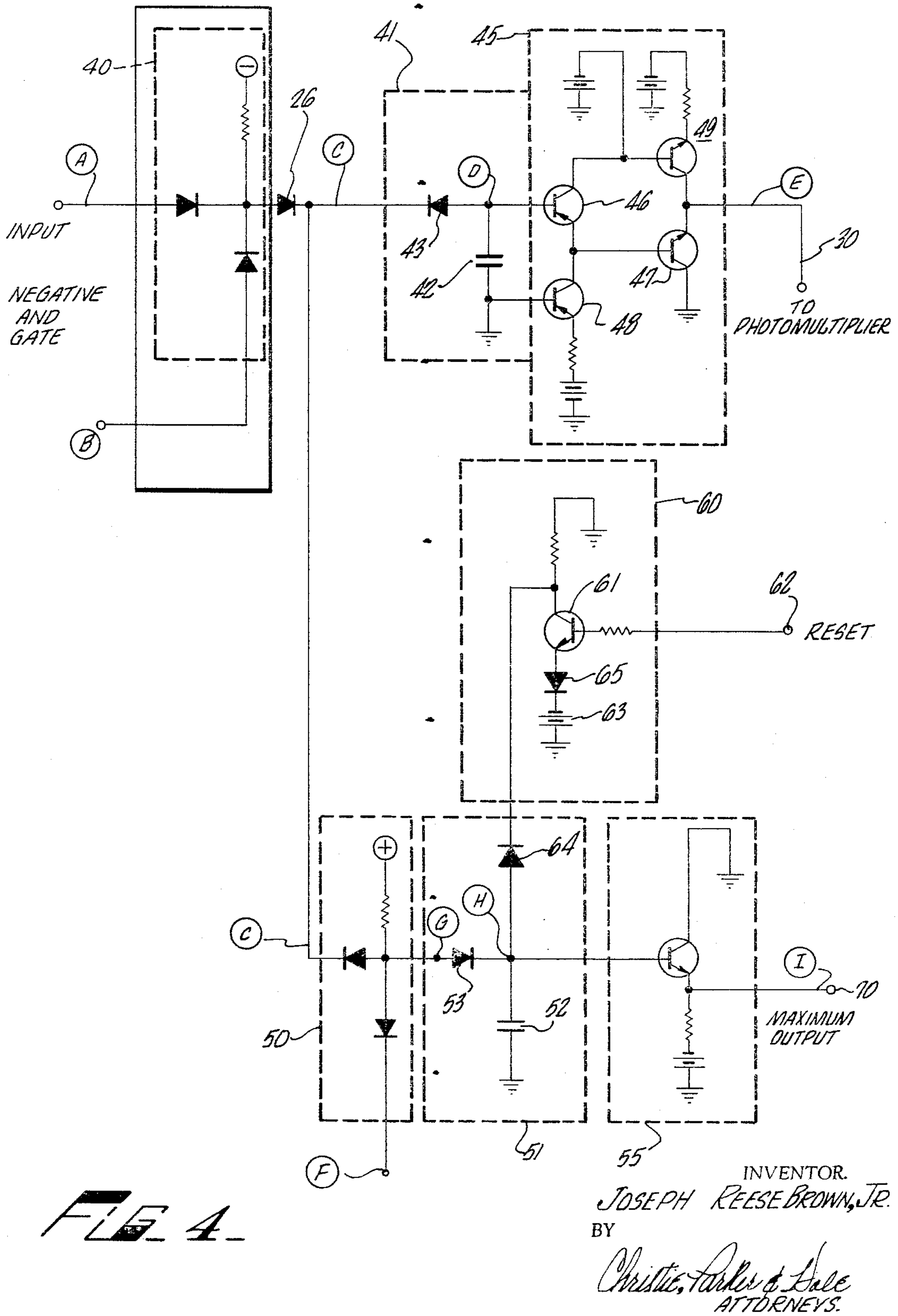
FIG. 4 is a schematic diagram of a preferred embodiment of a sampling circuit, in accordance with the invention.

In FIG. 4 the detector or voltage level sampling circuit 27 and one portion of a distributor are shown. The encircled capital letters at the input and output terminals of the circuits of FIG. 4 denote similarly lettered waveforms in FIGS. 5 and 6. A signal having a waveform A shown in FIG. 5 is applied to the input terminal of gate 40 which advantageously is one of the three gates of distributor 24. One analog signal of the group of three analog signals which are applied to the distributor 24 is selected by the occurence of an input gate signal B at gate 40. This gate signal is derived from the timing generator 33 in FIG. 3 and has the waveform and time of occurrence relative to the analog signals A as represented by these waveforms in FIG. 5. The application of an analog signal A and the concurrent appearance of a gate signal B produces an output from gate 40 at a terminal C. This output signal has the waveform C shown in FIG. 5. The gate pulse B, as shown, is of sufficient width to pass the analog signal and yet is short enough to discriminate between adjacent analog signals. Thereafter the detector comprising gate 50, maximum retaining circuit 51 and amplifier 55, will sample the signal having waveform C and will determine the value of the maximum voltage, or positive peak.

The minimum value or negative peaks of the analog signal C is detected by one minimum retaining circuit 41 for each distributor 24, and is fed back to the photomultiplier tube 21 for that distributor in order to stabilize the loop gain. Minimum retaining circuit 41 comprises a capacitor 42 and a diode 43. The capacitor 42 is connected in series with the diode 43 between the terminal marked C and a ground reference. As the voltage at terminal C becomes negative with respect to the ground reference, diode 43 is forward biased and capacitor 42 charges. The resultant voltage across capacitor 42 is shown as waveform D in FIG. 5. This voltage appears at terminal D in the minimum retaining circuit.

A buffer amplifier 45 is connected across the capacitor 42 and isolates the capacitor from the output circuit to prevent loading of the capacitor 42. Buffer amplifier 45 comprises a pair of transistors 46 and 47 connected in an emitter follower circuit and having constant current sources 48 and 49 as their respective emitter loads. Thereafter, the output voltage appearing at point E will be substantially identical to the voltage at terminal D in the minimum retaining circuit 41. It is this voltage which is fed back by lead 30 to the photomultipliers in order to stabilize the loop gain in the manner described hereinbefore.

The analog signal appearing at terminal C is also applied to a positive AND gate 50. Positive AND gate 50 has another waveform F, FIG. 6, applied to an input terminal which is connected to the timing generator 33 of FIG. 3. The gate pulse F occurs during the maximum positive peak of the analog signal and is sufficiently narrow to exclude the minimum voltage levels which occur prior to and after the positive peak of the sampled analog signal. Thus, gate pulse F of FIG. 6 is narrower than sampling pulse B of FIG. 5 and occurs approximately at the midpoint thereof. This gate signal F thus assures that substantially only the positive peak is gated through to the positive peak detector cricuit 51.

The output signal G from AND gate 50 appears at diode 53 and has the waveform shown in FIG. 6. Comparison of waveform G with waveform C shows that only the positive peak and the signal immediately before and immediately after the peak are passed by the gate 50. The maximum level of signal G is detected by a positive peak detector and maximum voltage retaining circuit 51. This maximum retaining circuit comprises a capacitor 52 and a diode 53, which are connected in series between ground and the output of AND gate 50. As the voltage level at point G becomes more positive than the voltage at the junction point H between diode 53 and capacitor 52, the diode 53 will conduct more current and capacitor 52 will increase its charge. The signal appearing across capacitor 52 will have the waveform H shown in FIG. 6. Thus, the capacitor 52 is responsive to the maximum voltage level of the analog signal. The output of the maximum retaining circuit 51 is coupled through a buffer amplifier 55 to an output terminal 70. The buffer amplifier may advantageously be a transistor emitter-follower circuit to isolate the maximum retaining circuit 51 from the other circuits of FIG. 3.

The output I, at terminal 70 of FIG. 3, which represents the difference in voltage level between the maximum voltage level and the minimum voltage level, is coupled to a mixer circuit 28 of FIG. 3. Mixer 28 also receives the difference outputs from the remaining detector circuits and discriminates between all the outputs from these detectors in order to pass only the maximum signal. This maximum value signal is coupled from mixer 28 to an amplifier 29, which reduces the signal in value by some preselected percentage such as ten percent. The outputs of the detectors 27 are also coupled directly to a differential comparator 31 in each channel. Each differential comparator 31 has two input leads. One from its respective detector 27 and the other from amplifier 29. The reduced output from amplifier 29 has a value that is greater than all of the other output signals from detectors 27 except the one that originally applied the maximum value signal to mixer 28. Thereafter, all the differential comparators 31 compare these two input signals and if the input signal from amplifier 29 is of greater amplitude than the input signal from detector 27 for each comparator 31, no output signal will be produced. Accordingly, only the channel associated with the correct identity of the unknown has a maximum value signal stored therein, which signal is greater in magnitude than the signal supplied by amplifier 29. Differential comparator 31 is coupled to a recording means 32 and produces a visual or an electronic indication of an ouput for this particular channel, thereby identifying the unknown character in accordance with the predetermined and known characters assigned to each channel as shown in FIG. 3.

After the maximum voltage level of one analog signal is detected, mixed, reduced and compared, and the unknown established by the operation described, the circuitry must be cleared for the identification of the next unknown. Therefore, it becomes necessary to reset the maximum retaining circuit 51. A resetting circuit 60 is shown in conjunction with maximum retaining circuit 51. The resetting circuit 60 includes a transistor switch 61, which is responsive to a reset signal applied to terminal 62. When a reset signal is applied to terminal 62 by timing generator 33 the transistor 61 closes and effectively couples terminal H in the maximum retaining circuit 51 to the negative terminal of a source 63 through a diode 64 and a diode 65. Thus capacitor 52 of retaining circuit 51 is readily reset to a selected voltage level in preparation for the application of a new analog signal to the sampling circuit. Thereafter, by the operation described hereinbefore the next unknown is readily identified by the circuit of this invention.

It is to be understood that the above-described arrangements are illustrative of the principles of this invention. Numerous other arrangements may be devised by those skilled in the art without departing from the spirit and scope of this invention.

What is claimed is:

1. An optical recognition system for identifying an unknown character from among a plurality of known characters comprising means for optically matching the unknown with a plurality of known character standards, means for converting each optical match into an electrical signal, a means for applying said signals to channels individual for each match, means adjusting all electrical signals produced by the matching operations to a common reference value for defining a plurality of signals having variable amplitudes relative to the common reference value, and each signal of the plurality having an amplitude representative of the closeness of the match between the unknown and a known character, a maximum reading storage circuit in each channel for storing the maximum electrical signal for that channel's character match, a signal reducing circuit, a mixing circuit common to all of said storage circuits for comparing all of said stored maximum signals with each other and for passing to said signal reducing circuit a mixer output signal equal in amplitude to the higest maximum amplitude of all of the signals stored in said storage circuits, a comparison circuit individual to each channel and connected to that channel's individual maximum storage circuit, means connected between the signal reducing circuit and said individual comparison circuit for applying said reduced mixer output signal in common to all of said comparison circuits, and a recording means individual to each channel and responsively activated only when the maximum stored signal of the one channel associated with the identity of the unknown character exceeds the reduced mixer output signal.

2. An optical recognition system as defined in claim 1 wherein each signal of each match is of a waveform having a maximum and two minimum voltage values, and wherein said signal applying means comprising a first gate in each channel operatively responsive to a first pulse applied at selected intervals to pass a preselected portion of the input signal having at least one maximum and at least one minimum value, and wherein said signal adjusting means comprises a first peak detecting circuit for storing the minimum voltage value of the preselected portion and for applying said value to said optical match to electrical signal conversion means to assure all minimum voltage values are at a common level, a second gate in each channel operatively responsive to a second pulse applied at selected intervals to pass a portion of the preselected portion of the input signal including only the maximum value passed by said first gate, and wherein said maximum reading storage circuit is connected to the output of said second gate for detecting and storing the maximum value of voltage thereat prior to applying this maximum value to said mixing circuit.

3. In an optical character recognition system including a source of a plurality of analog voltage signals occurring in a selected number of discrete groups and being derived from the comparison of a plurality of known characters with an unknown character by light transmission of the image of the unknown through the known character and conversion to voltage levels corresponding to the amount of light transmitted, the combination comprising means for separating individual analog signals from each discrete group and for applying each individual analog signal so separated to a preselected channel, each channel being associated with an individual known character in the optical character recognition system, means in each channel for detecting the maximum voltage level of the individual analog signal applied to that channel and for holding the detected voltage level at an output terminal of the detecting means; means responsive to the terminal voltage levels of the detecting means in all channels for passing only the signal having the maximum voltage level thereat relative to all other detected signals; means connected to the passing means for reducing voltage value passed by the passing means; means in each channel for comparing the output signal from each associated detecting means with the output signal from the reducing means, the comparing means in each channel being operative for emitting an output signal only when the signal from its associated detecting exceeds the output signal from the signal reducing means, and indicating means in each channel responsive to the presence of an output signal indication from its associated comparing means for identifying the unknown character.

4. In an optical character recognition system for determining the identity of an unknown character, the combination comprising a mask of a plurality of transparent known characters on a disc separated into discrete groups of a fixed number of characters, an optical system for projecting light including a darkened image on the mask, means for moving each known character across the path of the projected image for obtaining variable quantities of light which pass through each known character of the mask as it moves into and out of registration with the unknown, means for converting the light passing through the mask into a plurality of analog voltage signals equal in number to the number of known characters on the mask with each analog voltage signal having a maximum voltage level corresponding to a minimum amount of light passing through each known character, a timing track on the disc for producing an output signal corresponding to the beginning of the scan of each group of known characters on the mask, means responsive to the output signal from the timing track producing means for separating each group into individual analog signals representative of one of the known characters, means for applying each individual analog signal to a separate channel associated with the known character, a voltage level sampling means in each channel for detecting and storing the maximum voltage level for that channel's analog signal, means common to all channels and responsive to the detecting means in each channel for singularly passing the signal having the greatest amplitude, means responsive to the passing means for reducing the output signal from the passing means, means in each channel for comparing the output from the associated detecting means and the reducing means, each comparing means having an output signal when the input signal from the detecting means is larger than the input signal from the reducing means, and means in each channel for producing a visual indication when a signal passes through its associated comparing means to indicate a match which identifies the unknown character.

5. A circuit for determining the identity of an unknown in a character recognition system comprising optical means for repetitively superimposing an image of an unknown character to be recognized on a plurality of known characters; means for emitting an analog signal in response to each superimposition of the unknown character with a known character, each emitted analog signal having a maximum amplitude with respect to a common reference level for all emitted signals which amplitude is directly proportional to the degree of closeness of the superimposition of the unknown with each known character; a plurality of storage means for storing individually the maximum value of each analog signal emitted from said signal emitting means; means in common to said plurality of storage means for selecting the one signal having the highest amplitude from among the stored signals; means connected to said selecting means for reducing the amplitude of the selected highest amplitude signal by a predetermined amplitude amount; means for comparing said reduced amplitude signal with the amplitude of all of said signals stored in said storage means; and indicating output means individually associated with said known characters and connected to said comparing means for delivering and output indication only from the one storage means of said plurality of storage means having stored therein an amplitude signal greater than that of said reduced amplitude signal.

6. A circuit for identifying an unkown character in a character recognition system comprising means for converting a series of optical matches of an unknown with a plurality of known characters into a plurality of signals, each signal of variable signal strength representative of the closeness of said optical match between the unknown and each known of the series of matches; means individually associated with each known character for separately registering the signal strength of signals produced by each match of the unknown with each one of the known characters, signal mixer means connected in common to said registering means for delivering a mixer output signal equal to the signal of greatest strength stored in said registering means; signal attenuating means connected to the output of said signal mixer means for reducing the strength of said mixer output signal by a predetermined amount; signal applying means connected between said attenuating means and said signal registering means for applying the attenuated mixer output signal to all of said registering means; signal comparison means for comparing the signal strength in each registering means with the attenuated mixer output signal applied thereto; and register selecting means connected to said comparison means for selecting that one of the plurality of registering means having stored therein a signal of greater strength than the attenuated mixer output signal.

References Cited

UNITED STATES PATENTS

| | | | |
|---|---|---|---|
| 2,933,246 | 4/1960 | Rabinow | 235—61.11 |
| 2,985,366 | 5/1961 | Scarrott | 235—61.11 |
| 3,103,646 | 9/1963 | Sheaffer et al. | 340—146.3 |
| 3,104,369 | 9/1963 | Rabinow et al. | 340—146.3 |
| 3,142,824 | 7/1964 | Hill | 340—173 |

DARYL W. COOK, *Primary Examiner.*

MAYNARD R. WILBUR, J. SCHNEIDER, *Assistant Examiners.*

UNITED STATES PATENT OFFICE
CERTIFICATE OF CORRECTION

Patent No. 3,333,244 July 25, 1967

Joseph Reese Brown, Jr.

It is hereby certified that error appears in the above numbered patent requiring correction and that the said Letters Patent should read as corrected below.

Column 4, line 57, for "by" read -- be --; line 60, for "in", second occurrence, read -- is --; column 8, line 26, before "terminal" insert -- output --; line 36, after "detecting" insert -- means --; line 46, after "image" insert -- of an unknown character --; column 9, line 21, after "highest" insert -- signal --.

Signed and sealed this 29th day of October 1968.

(SEAL)
Attest:

Edward M. Fletcher, Jr.
Attesting Officer

EDWARD J. BRENNER
Commissioner of Patents